United States Patent
Wang et al.

(10) Patent No.: US 11,057,936 B2
(45) Date of Patent: Jul. 6, 2021

(54) MECHANISM FOR MERGING COLLIDING RACH PROCEDURES

(71) Applicant: Telefonaktiebolaget LM Ericsson (publ), Stockholm (SE)

(72) Inventors: Min Wang, Luleå (SE); Jan Christoffersson, Luleå (SE); Mats Folke, Vällingby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 352 days.

(21) Appl. No.: 16/090,660

(22) PCT Filed: Jul. 12, 2018

(86) PCT No.: PCT/SE2018/050761
§ 371 (c)(1),
(2) Date: Oct. 2, 2018

(87) PCT Pub. No.: WO2020/013741
PCT Pub. Date: Jan. 16, 2020

(65) Prior Publication Data
US 2020/0351944 A1   Nov. 5, 2020

(51) Int. Cl.
*H04W 4/00* (2018.01)
*H04W 74/08* (2009.01)
(Continued)

(52) U.S. Cl.
CPC ....... *H04W 74/0833* (2013.01); *H04L 1/1614* (2013.01); *H04W 52/36* (2013.01);
(Continued)

(58) Field of Classification Search
CPC ............. H04W 74/0833; H04W 52/36; H04W 72/0446; H04W 72/0453; H04W 74/0808
See application file for complete search history.

(56) References Cited

U.S. PATENT DOCUMENTS

2013/0070700 A1* 3/2013 Chang ................... H04W 74/08
                                                      370/329
2013/0242730 A1* 9/2013 Pelletier ............ H04W 28/0284
                                                      370/230
(Continued)

FOREIGN PATENT DOCUMENTS

EP        3065476 A1    9/2016
EP        3169116 A1    5/2017
WO    2016053179 A1    4/2016

OTHER PUBLICATIONS

3rd Generation Partnership Project, "3rd Generation Partnership Project; Technical Specification Group Radio Access Network; NR; Medium Access Control (MAC) protocol specification (Release 15)", Technical Specification, 3GPP TS 38.321 V15.2.0, Jun. 1, 2018, pp. 1-73, 3GPP, France.
(Continued)

*Primary Examiner* — Abdelnabi O Musa
(74) *Attorney, Agent, or Firm* — Coats & Bennett, PLLC

(57) ABSTRACT

The present disclosure presents example techniques for merging multiple concurrent RA procedures. For instance, the present disclosure describes an example method performed by a user equipment, UE (102), for performing random access to connect to a wireless access network. In an aspect the method includes determining that a second RA procedure (122) is triggered during a first RA procedure (120) that is ongoing. In a further aspect, the example includes combining the second RA procedure (122) and the first RA procedure (120). Corresponding UE, computer program, and processor/memory embodiments are also described.

15 Claims, 12 Drawing Sheets

(51) Int. Cl.
*H04L 1/16* (2006.01)
*H04W 52/36* (2009.01)
*H04W 72/04* (2009.01)

(52) U.S. Cl.
CPC ... *H04W 72/0446* (2013.01); *H04W 72/0453* (2013.01); *H04W 74/0808* (2013.01)

(56) References Cited

U.S. PATENT DOCUMENTS

| | | | |
|---|---|---|---|
| 2014/0161089 A1* | 6/2014 | Ahn | H04W 74/0833 |
| | | | 370/329 |
| 2019/0132880 A1* | 5/2019 | Byun | H04B 7/0695 |
| 2019/0268943 A1* | 8/2019 | Su | H04W 48/14 |
| 2020/0008188 A1* | 1/2020 | Nam | H04W 72/0446 |
| 2020/0163123 A1* | 5/2020 | Lee | H04W 74/0833 |

OTHER PUBLICATIONS

Lenovo et al., "Stopping of RACH during Scheduling Request procedure", Change Request, 3GPP TSG-RAN WG2 Meeting AH 1801, Vancouver, Canada, Jan. 22, 2018, pp. 1-3, R2-1801551.
Vivo, "RACH enhancements in NR-U", 3GPP TSG-RAN WG2 NR AH1807 Meeting, Montreal, Canada, Jul. 2, 2018, pp. 1-3, R2-1809863, 3GPP.

* cited by examiner

MECHANISM FOR MERGING COLLIDING RACH PROCEDURES

TECHNICAL FIELD

The application relates generally to wireless communications, and more particularly to techniques for merging colliding Random Access, RA, or Random Access Channel, RACH, procedures.

BACKGROUND

In existing contention-based radio access networks, a user equipment, UE, seeking to communicate with the network over the air must perform Random Access, RA, procedures, also referred to as Random Access Channel, RACH, procedures. RA can be initiated for a host of reasons, including initial radio access, requesting additional system information, SI, intra-cell beam switching procedures, cell handover, performing uplink, UL, or downlink, DL, signal transmission, regaining synchronization, etc.

For the Fifth Generation, 5G, New Radio, NR, protocols promulgated by the Third Generation Partnership Project, 3GPP, RACH procedures are limited to a single concurrent procedure for any UE. RACH procedure may be triggered in NR due to one or more of the following non-exclusive set of events: initial access from a Radio Resource Control, RRC, IDLE, RCC_IDLE, state, an RRC Connection Reestablishment procedure, cell handover, DL data arrival while the UE is in the RRC_CONNECTED state, e.g., when an UL synchronization status for the UE is "non-synchronized", UL data arrival while the UE is in the RRC_CONNECTED state, e.g., when UL synchronization status is "non-synchronized" or there are no available Physical Uplink Control Channel, PUCCH, resources for transmitting a scheduling request, SR, beam failure recovery, BFR, UE-positioning procedures while the UE is in the RRC_CONNECTED state, e.g., when a timing advance value is necessary for UE positioning, on-demand system SI transfer, etc.

Furthermore, with sufficiently many users in the system, random access procedures alone may cause such a high traffic load that all RA attempts cannot be adequately handled by the system. For this reason, in some instances, the network can send a backoff indicator to one or more UEs in the second Random Access Response, RAR, message, RA Message 2. This backoff indicator signals the UEs to wait for a random time, backoff time, as indicated by a backoff index, BI, until sending its next preamble, RA Message 1. In some instances, the backoff index can be made to be variable depending on the priority and the event triggering the random access procedure. In addition, prioritized RACH access has been envisioned for RA procedures triggered based on certain classes of triggering events.

Currently, different techniques have been disclosed for operation where multiple ongoing RA procedures overlap in time. For instance, in one technique, if a second or further RA procedure is triggered during an ongoing RA procedure, the UE may stop the ongoing RA procedure and simply start the newly triggered RA procedure in its place, given that only one RA procedure can be ongoing at a given time.

Given that different RA procedures can be triggered for different RA triggering events, however, the resulting RA processes be associated with different priority levels that can correspond to the priority of the triggering events in some instances. Typically, if a subsequently triggered RA procedure has a higher priority than that of an existing and ongoing RA procedure, the initial RA procedure is stopped and the associated time-frequency resources for this stopped RA procedure are released. Rather than using the released resources for the newly triggered RA procedure, the released RA resources would go unutilized. When the new RA procedure is finished, the UE would then have to re-initiate a new RA procedure for the previously stopped RA procedure. Accordingly, the total RA resources would ultimately be up to twice those necessary for a single RA procedure, reducing the RA resource utilization accordingly.

Additionally, current UE operation when a further RA procedure is triggered during an ongoing RA procedure can depend on when the further RA procedure is triggered along the RA process. For instance, if the UE is still transmitting RA preambles, RA Message 1s, the UE typically stops transmitting preambles and does not continue to monitor for RAR messages from the network node, and instead simply begins the preamble transmissions associated with the newly triggered RA procedure.

When the UE has received a RAR message from the network node, however, simply stopping the first ongoing RA procedure can be more problematic. In case the UE implementation is such that the grant in Message 2 is not used by the new procedure, the grant can be effectively wasted, and the new procedure must start by transmitting a new preamble. In some instances, the grant for the first RA procedure is too small for the newly triggered RA procedure, e.g., the first RA procedure uses preamble group A but the newly triggered RA procedure uses preamble group B, which will result in the new procedure being required to send a new preamble, effectively wasting time-frequency resources in the system.

Furthermore, if the UE has transmitted RA Message 3 and is waiting for reception of RA Message 4 from the network node, a stop operation for the ongoing RA procedure will cause the RA Message 4 to go unreceived, triggering unnecessary retransmissions by the network. Therefore, given the time-frequency resource waste associated with current techniques, improved techniques are needed for handling multiple concurrent RA procedures at UEs, focusing on greater RA resource utilization and limiting latency in the RA procedures as a whole.

SUMMARY

The present disclosure presents example techniques for merging multiple concurrent RA procedures. For instance, in some examples, where a first RA procedure has not yet received an RAR message from a network node, a combined first and second RA procedure can include transmitting one or more preambles, RA Message 1 s, using the ramped power of the first procedure. In a further aspect of the disclosure, the RA Message 3 of the two procedures can be combined by a UE into a single message, for instance, by either multiplexing multiple RA Message 3s into one transmission or by sending one of the RA Message 3 for a selected RA procedure and indicating in this single RA Message 3 that there are one or more RA Message 3s from the other procedure(s, which also require a grant to be resolved.

Specifically, the present disclosure describes an example method performed by a UE for performing random access to connect to a wireless access network. In an aspect the method includes determining that a second RA procedure is triggered during a first RA procedure that is ongoing. In a further aspect, the example includes combining the second RA procedure and the first RA procedure.

In a further aspect, an example UE is described for performing RA to connect to a wireless access network. The example UE can be configured to determine that a second random access procedure is triggered during a first RA procedure that is ongoing. The example UE can also be configured to combine the second RA procedure and the first RA procedure. In addition, related computer programs and computer-readable media are disclosed.

DETAILED DESCRIPTION

The example embodiments introduced in the present disclosure provide techniques for combining multiple RA processes in a wireless communication system. For instance, the disclosure describes non-limiting embodiments whereby two or more RA procedures can be combined into a single combined RA procedure. To these ends, the techniques address several potential scenarios that could be encountered during RA operations. For instance, the embodiments discussed herein can be utilized to direct the behavior of, and interaction between, network node devices and UEs when, after a first RA procedure has been triggered but has not completed, a second RA procedure is triggered. Likewise, the present disclosure discusses operation in situations when the first RA procedure has not yet received a random access response message, also known as RAR or RA Message 2, when the second RA procedure is triggered. In an aspect of the present disclosure, when the multiple RA procedures are combined, all further transmissions of the single combined procedure utilize a transmission power according to the power ramping of the RA procedure that was initiated first.

Furthermore, in example embodiments of the present disclosure, the RRC Connection Request message(s, also known as RA Message 3, of each of the multiple combined RA procedures can be combined into a single combined RA Message 3. In some examples, this procedure can involve multiplexing the Message 3 for both combined RA procedures into a combined Message 3. In an aspect, this can include the UE transmitting one of the Message 3s corresponding to one of the RA procedures and indicating in this message that there is another Message 3 from the other combined procedure(s, which also require a grant of time-frequency resources. These and other aspects of the present embodiments are further described below in reference to the figures.

Figure 1:
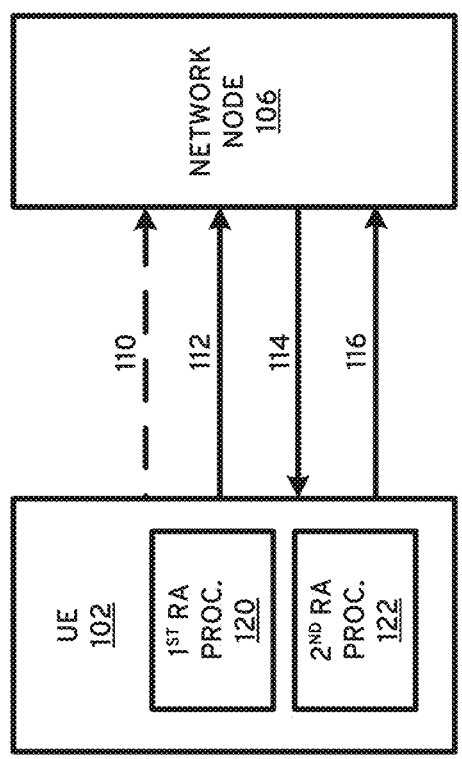
FIG. 1 illustrates a wireless communication system corresponding to example embodiments of the present disclosure.

FIG. 1 illustrates a communication environment 100 that includes a network node 106 configured to communicate with and grant time-frequency resources for one or more UEs 102. In particular, the figure shows several RA-related transmissions that may be performed by either the network node 106 or UE 102 according to the example embodiments described herein. For instance, in some examples, a first event can trigger a first RA procedure 120, which can, in some instances result in the transmission of a first RA Message 1 110 at an initial transmission power level. As indicated in FIG. 1, the RA Messages 110 can in some instances not be transmitted before the RA procedures are combined, and are therefore optional, as indicated by the dotted line.

After the first RA procedure 120 has been triggered, whether before or after the first RA Message 1 110 is transmitted to the network node 106, a second RA procedure 122 can be triggered by a second event while the first RA procedure 120 is ongoing, effectively resulting in two concurrent RA procedures being conducted by the RA. Based on the presence of multiple concurrent RA procedures in the UE 102, the UE 102 can combine these multiple RA procedures into a single RA procedure, and accordingly, may transmit RA Message 1s 112 that include RA Message 1s for each of the multiple RA procedures and/or may transmit a single RA Message 3 116 for the multiple procedures. For purposes of the present disclosure, any of these messages that correspond to combined RA procedures (such as message 112 of FIG. 1) can be referred to as a combined RA message. Therefore, by utilizing the techniques presented by the present disclosure and introduced in FIG. 1, the system 10 allows UEs 2 to conduct multiple concurrent RACH procedures but in a manner that is line with specification mandates, while allowing for improved spectrum efficiency and throughput.

As introduced above, in an aspect of the present disclosure, a UE 102 that has not yet received an RAR message, e.g., RA Message 2 114, from the network node 106 for an ongoing first RA procedure 120 may initiate a second RA procedure 122 based on a triggering event and can combines the first and second RA procedure 122s, utilizing the ramped transmission power level of the first RA procedure 120 for any subsequent RA transmissions. In an aspect each of these subsequent RA transmissions can be combined transmissions in that they contain information corresponding to an RA Message 1 112 for each of the multiple combined RA procedures.

Figure 2A:
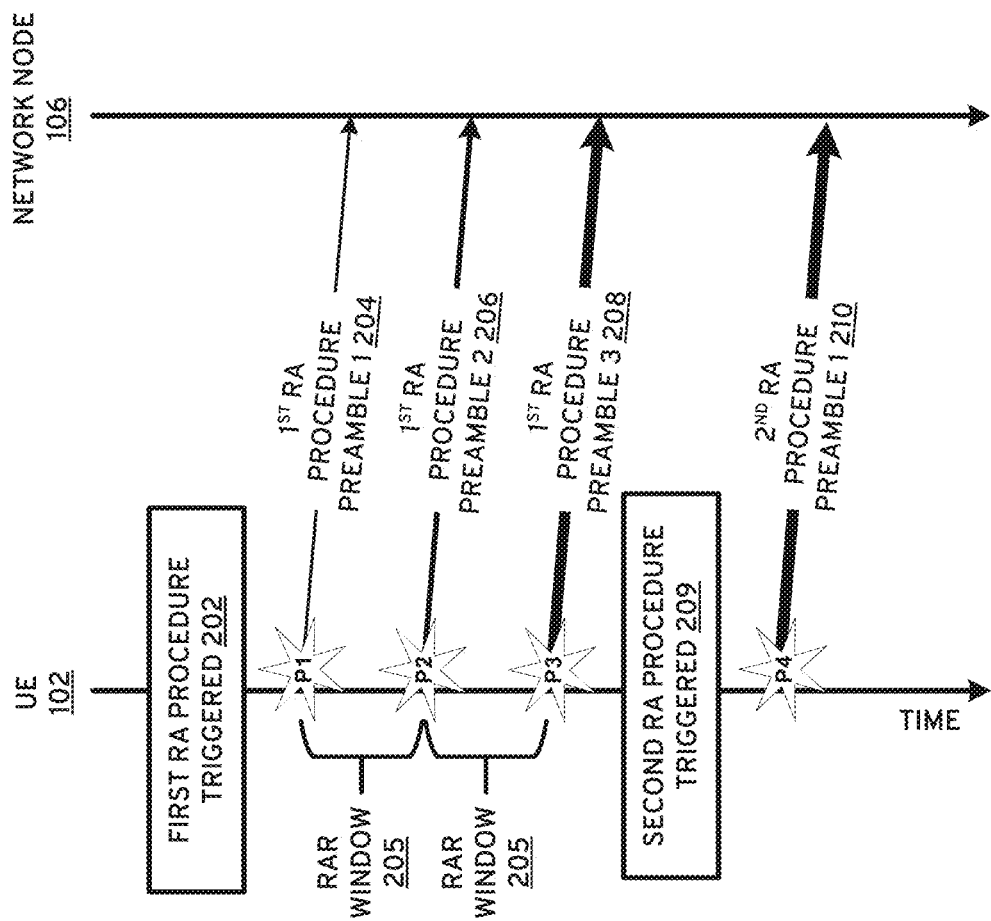
FIG. 2A illustrates a signal flow performed by a UE and network node according to one or more embodiments.

FIG. 2A contains a signaling diagram that illustrates this aspect in an example embodiment. As shown, a first RA procedure is triggered by the occurrence of a trigger event at block 202. Based on the triggering of the first RA procedure at block 202, the UE 102 can transmit a first preamble 204 for the first RA procedure. This first preamble can be transmitted at a transmission power level P1, which in some examples may be a configured initial RA transmission power for the UE 102 or an initial RA power level that is otherwise obtained and/or implemented by the UE 102. After a time duration corresponding to an RAR window 205 has elapsed without the UE 102 receiving a RAR message, e.g., RA Message 2 114, from the network node 106, the UE 102 can transmit a second preamble 206 using a ramped power level P2 that is of a different, e.g., higher, power level than P1. Again, should another RAR window 205 elapse without an RAR message being received at the UE 102, the power level can again be ramped to a different power level P3 and a third preamble 208 for the first RA procedure can be transmitted.

As illustrated at block 209 in the example embodiment of FIG. 2A, in some instances, after one or more RA preambles, e.g., RA Message 1s 112, are transmitted by the UE 102, a second event may occur that triggers a second RA procedure. In an aspect, based on the second RA procedure being triggered during the first RA procedure and before an RAR message has been received at the UE 102, the UE 102 stops the first RA procedure and starts a new, second RA procedure that inherits the transmission power ramping state of the stopped first RA procedure. For purposes of the present disclosure, to "inherit" the transmission power ramping of another RA procedure means to use a last-utilized transmission power level of the inherited RA procedure as the initial transmission power for the new procedure. Accordingly, in operation, a parameter PREAMBLE_RECEIVED_TARGET_POWER, PRTP, in the new combined RA procedure can have an initial value that is set as the last value used in the first, now canceled, RA procedure. In other words, where, as in FIG. 2A, there have been multiple preamble transmissions for the same RA procedure and accordingly a PREAMBLE_POWER_RAMPING_COUNTER, PPRC, value has been appropriately incremented according to the number of such preamble transmissions, the value of the PPRC for the first RA procedure can be used to determine PRTP, such as according to Equation 1, as follows:

$$PRTP_{new} = PRTP_{old} + \Delta_{preamble}(PPRC_{old}-1) \times PPRS \quad (1)$$

where:
$PRTP_{new}$=PREAMBLE_RECEIVED_TARGET_POWER of the combined RA procedure;
$PRTP_{old}$=PREAMBLE_RECEIVED_TARGET_POWER of the first RA procedure;
$\Delta_{preamble}$=DELTA_PREAMBLE power offset constant value based on preamble format;
PPRS=PREAMBLE_POWER_RAMPING_STEP value indicating amount transmission power is stepped for each preamble retransmission.

In some instances, RA procedures triggered in the same UE 102 may have different preamble formats, and therefore may have different PPRS values based on such formats. Therefore, the UE 102 may use the PPRS value configured for the first canceled RA procedure, the PPRS value configured for the second RA procedure, or any procedure after the first RA procedure in the event that three or more RA procedures are concurrent, a maximum or minimum PPRS value of the concurrent RA processes, or another similar formulation for determining the PPRS value to be used for purposes of determining the initial transmission power P4 of the combined RA procedure.

As shown in FIG. 2A, once P4 is determined accordingly, the UE 102 can transmit a combined RA message 210 that includes a preamble for the combined procedure, including RA Message 1s for the first and second RA procedures, using P4. If subsequent retransmissions of the preamble for the combined RA procedure are needed, the UE 102 can continue the ramping of the transmission power according to Equation 1 above using the configured PPRS for the second RA procedure, or the PPRS value used to determine the initial P4 value, if different. Like the PPRS value, should the RAR window for the second RA procedure differ from that of the first RA procedure, the UE 102 can utilize the RAR window value from any of the combined RA procedures, a maximum or minimum thereof, or any other configurable value based on these values.

Furthermore, in some examples, the UE 102 may transmit the combined preamble transmissions of the combined RA procedures at not only any configured preamble transmission instances associated with the second RA procedure, but may also utilize any existing preamble transmission instances configured for the first, now canceled, RA procedure. By doing so, such instances will not be effectively lost with the cancelation of the first RA procedure because they will thereafter be utilized for the transmission of a combined preamble transmission of the combined RA procedure, which can contain preambles associated with each of the combined RA procedures.

As explained above, the example signal flow shown in FIG. 2A can be utilized in situations in which a second, or further, RA procedure is triggered in a UE 102 during an ongoing RA procedure, but before an RAR message has been received from the network node 106 in the existing RA procedure. If, however, the RAR message, RA Message 2, has been received by the UE 102 for the existing RA procedure at the time the second or subsequent RA procedure is triggered, the merging of the multiple RA procedures can involve generating and transmitting a combined RA Message 3 116. This aspect of the present disclosure is shown in the signal flow of FIG. 2B.

Figure 2B:
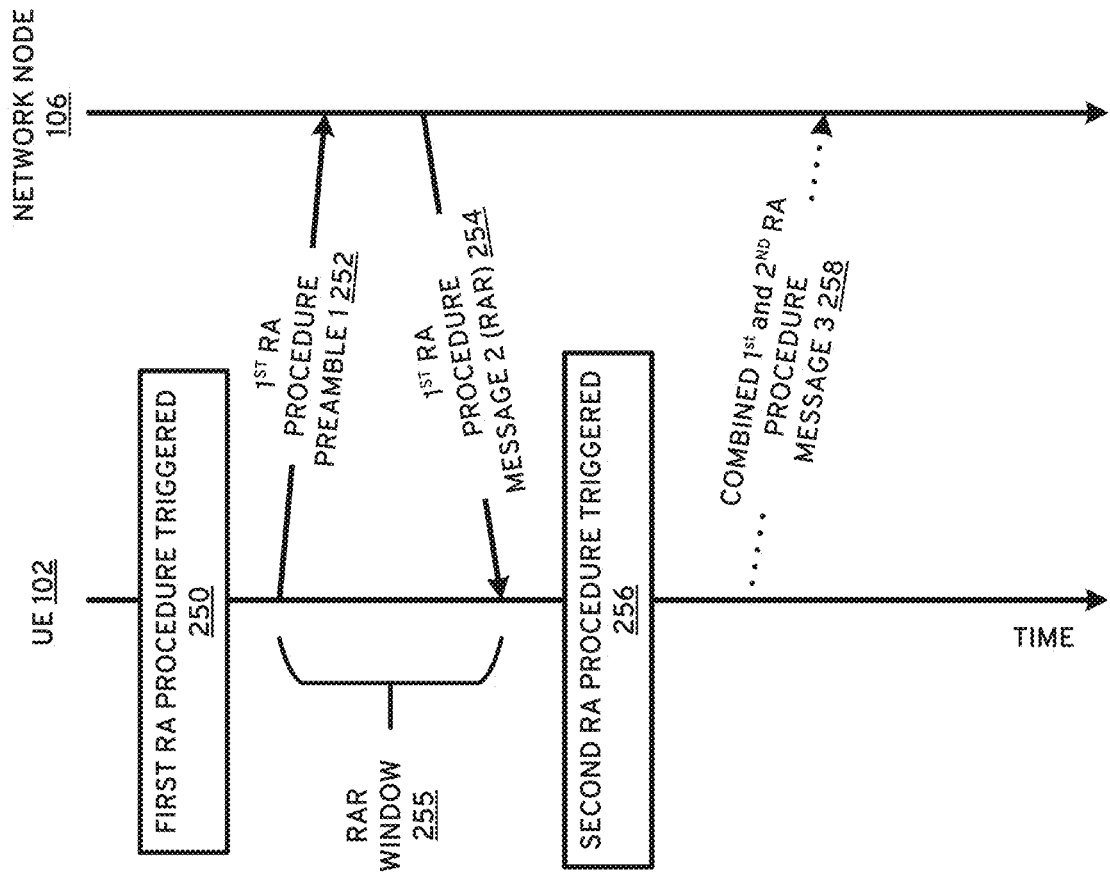
FIG. 2B illustrates a signal flow performed by a UE and network node according to one or more embodiments.

As shown in FIG. 2B, when the UE 102 has received an RAR 254 for the ongoing RA procedure before expiration of the RAR window 255, the UE 102 can effectively continue the ongoing RA procedure or procedures along with the newly triggered RA procedure by including an indication for all RA procedures in any RA Message 3 transmissions 258. In an aspect, because these RA Message 3 transmissions 258 can contain RA Message 3s for both the first procedure and the second procedure, it can be referred to herein as a combined RA message 3. Likewise, because in some instances the first RA procedure can be canceled and combined into the combined RA procedure along with the second RA procedure after it is triggered at block 256, the second procedure can be referred to as a combined procedure herein.

If, however, the network node 106 has already set a dedicated preamble for the ongoing RA procedure and/or scheduled time-frequency resources for the ongoing RA procedure, the UE 102 may only indicate the newly triggered RA procedure, or its triggering event, in the combined RA Message 3 258. Likewise, in such a scenario, the UE 102 may indicate in the RA Message 3 for the newly triggered RA procedure that the ongoing RA procedure is now being combined with the newly triggered RA procedure into a combined RA procedure. In an optional aspect, a new Media Access Control, MAC, Control Element, CE, may be defined for such purposes.

Furthermore, in order to limit overhead, a bitmap may be introduced into the messaging structure, whereby each bit in the bitmap indicates a specific RA procedure and/or triggering event or RA procedure. As a combined RA procedure may carry more than two RA procedures events, the bitmap can include more than two RA procedures or associated triggering events. To indicate the bitmap, the UE 102 may reuse any other existing field from any existing MAC CE to indicate the combined RA events, including by including the bitmap and/or a portion thereof. In another option, the UE may use the RRC message of Message 3 to indicate the combined RA events and/or the bitmap, and a new RRC information element, IE, may be defined accordingly.

As described above, the combined RA Message 3 of FIG. 2B can include indications for all concurrent RA procedures, e.g., via the bitmap. This can include, in some embodiments, each Message 3 itself, or may include a single Message 3 for a selected RA procedure and additionally a flag or similar indication that indicates that the other concurrent RA procedures exist. In such embodiments, the UE 102 can select which of the ongoing RA processes or ongoing triggering events the Message 3 will be associated with, i.e. a "main RA procedure" for the RA Message 3, in case there are multiple concurrent RA processes. In an aspect, the UE 102 can select which of the concurrent RA processes is to be the main RA procedure for the Message 3 based on a priority order for the RA events with which the RA procedures are associated. The other ongoing RA procedure or procedures, i.e., the other ongoing RA procedures other than the main RA procedure, can be suspended temporarily until the main RA procedure has completed, and can start after the main RA procedure has been finished.

In an aspect of the present disclosure, the relative priorities of different types of RA procedure triggering events can be configured by the network or can be hard-coded in the specifications/protocols according to which the system 10 operates. The determination of the relative priorities may consider the existing Quality of Service, QoS, indicators for the network, such as the priority levels of one or more logical channels that are associated with each RA event. In alternative embodiments, when there are multiple concurrent ongoing RA procedures, the UE 102 may choose to terminate one or more of the RA procedures with lower priority levels and instead simply continue with a single RA procedure for the RA event with high priority. In the event that there are several concurrent RA procedures with the same priority, the UE may select any one of them for initiating, or continuing, the selected RA procedure.

Figure 3:
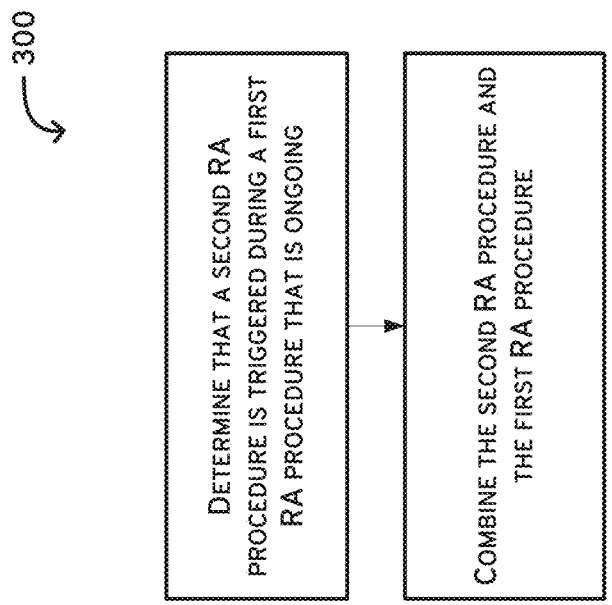
FIG. 3 illustrates a method performed by a UE according to one or more embodiments.

FIG. 3 illustrates an exemplary method 300 performed by a UE 102 according to the present disclosure. For instance, method 300 may include, at block 302, the UE 102 determining that a second RA procedure is triggered during a first RA procedure that is ongoing. In addition, at block 304, method 300 can include combining the second RA procedure and the first RA procedure.

Further, although not explicitly shown in FIG. 3, method 300 may include further aspects, which have been generally introduced above. For instance, method 300 may include, in some examples, the UE 102 determining that an RA response message, RA Message 2, for the first RA procedure has not been received upon determining that the second RA procedure is triggered. In such examples and potentially others, method 300 can also include transmitting a combined RA message for the combined first RA procedure and second RA procedure at any RA transmission occasions for the first RA procedure or the second RA procedure. In some examples, the combined RA message can include a reserved preamble that identifies the combined RA message as representing a preamble transmission for multiple RA processes. In another technique for identifying combined RA messages to a network node, method 300 can include the UE transmitting the combined RA message over time-frequency resources reserved for combined RA messages, thereby identifying the combined RA message as representing a preamble transmission for multiple RA processes, i.e., containing RA messages and/or related information for two or more RA procedures.

Furthermore, in some examples, combining the RA procedures can include setting a transmission power for any RA messages by continuing a transmission power ramping from the first RA procedure. In an aspect, continuing the transmission power ramping can include setting a PREAMBLE_RECEIVED_TARGET_POWER for any RA messages as a most recently used transmission power value for any transmission in the first RA procedure. In alternative or additional examples, continuing the transmission power ramping can include setting PREAMBLE_POWER_RAMPING_COUNTER for any RA messages as a most recently used transmission power ramping counter for any transmission in the first RA procedure. In addition, some examples of method 300 can include continuing the back-off operation according to a backoff indicator, BI, value for any RA messages as a most recently used BI for any transmission in the first RA procedure.

In further example aspects of method 300, upon determining that the second RA procedure is triggered, determining that an RA response, RAR, message for the first RA procedure has been received, and determining that an RA event for the first RA procedure has been registered by the wireless access network. In addition, in this example and others, combining the RA procedures can include, responsive to determining that the RAR message for the first RA procedure has been received and the RA event has been registered, including information for only the second RA procedure in an RA Message 3 for the ongoing first RA procedure.

In another example, the method 300 can include the UE including an indication in an RA message, such as an RA Message 1 and/or RA Message 3, that the first RA procedure is being combined with the second RA procedure in the RA Message 3. In an additional aspect, the indication, and/or the related information, for the second RA procedure can include a reference to a particular RA event of multiple possible RA events in an RA event bitmap. In some instances, the indication, and/or the related information, is included in one or both of a new control element in the RA Message 3 and an existing control element in the RA Message 3.

Furthermore, in some examples, method 300 can include transmitting at least one combined RA message, which can each be a multiplexed RA message, where each multiplexed RA message includes a first RA message corresponding to the first RA procedure multiplexed with a second RA message corresponding to the second RA procedure. In other examples, transmitting the at least one combined RA message can include transmitting an RA message corresponding to the first RA procedure and an indicator indicating that another RA message corresponding to the second RA procedure is awaiting transmission. The one or more combined RA message can optionally include RA Message 1s and/or RA Message 3s for two or more RA processes. Though these examples are presented in a paradigm wherein only a first and second RA procedure are involved, this is not meant to be limiting. Instead, for any of these example embodiments, and any embodiments described in the present paper, generally, the techniques described can be implemented for any number of multiple RA procedures.

In further examples, transmitting the combined RA messages can include transmitting an RA message corresponding to the second RA procedure and an indicator indicating that another RA message corresponding to the first RA procedure is awaiting transmission. In some examples, the method 300 can include the UE 102, upon determining that the second RA procedure is triggered, determining that an RAR message for the first RA procedure has been received, and determining that an RA event for the first RA procedure has not been registered by the wireless access network. Furthermore, in this and other examples, combining RA procedures can be responsive to a UE determining that the RAR message for the first RA procedure has been received and the RA event has not been registered, including information for the first RA procedure and the second RA procedure in an RA Message 3 for the ongoing first RA procedure.

In additional or alternative examples of method 300, determining that the second RA procedure is of a higher priority than the first RA procedure, and wherein the combining is responsive to determining that the second RA procedure is of a higher priority than the first RA procedure.

Figures 4A, 4B:
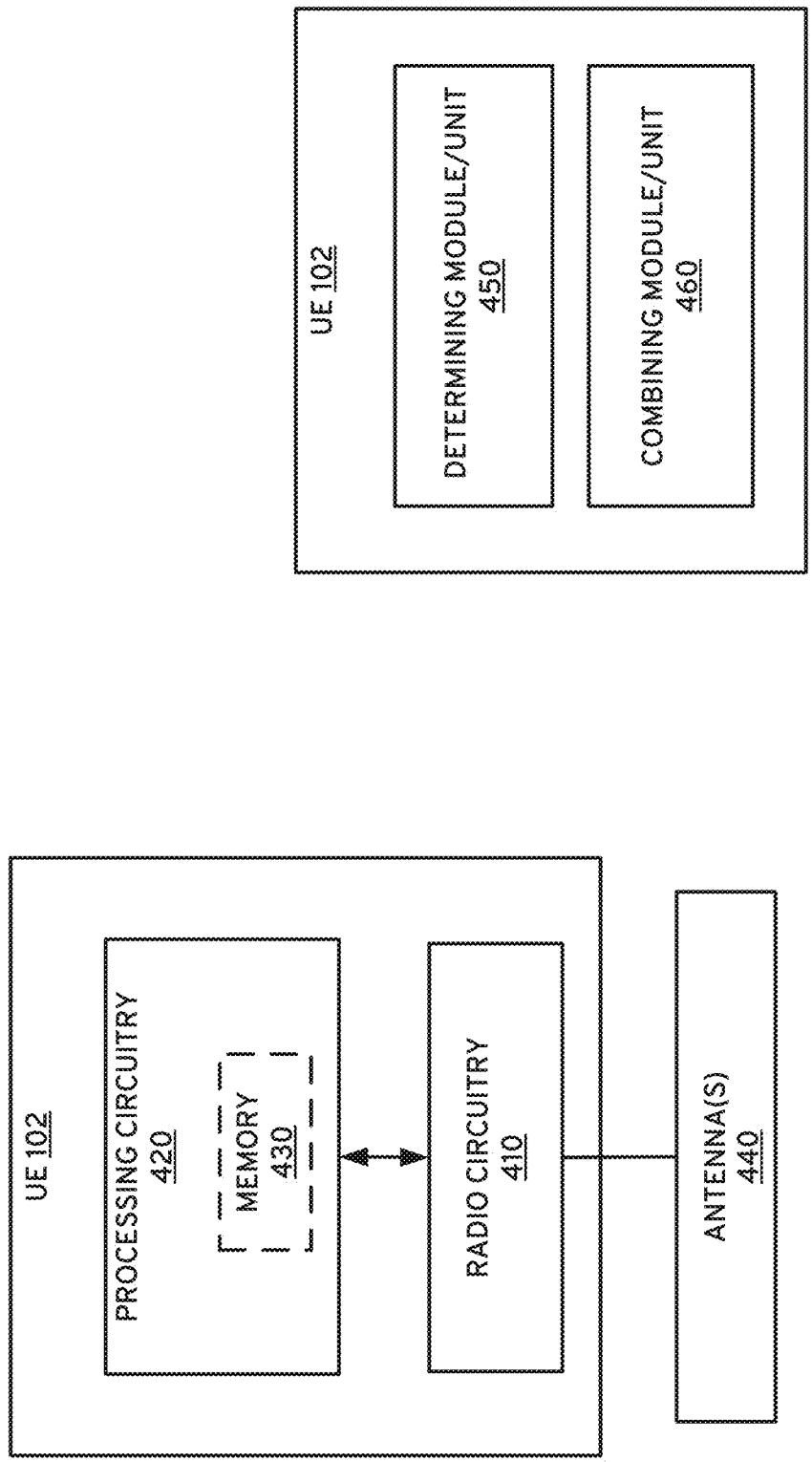
FIGS. 4A and 4B illustrate details of an example UE according to one or more embodiments.

FIG. 4A illustrates additional details of an example UE 102 according to one or more embodiments. The UE 102 is configured, e.g., via functional means or units, to implement processing to perform the aspects described above in reference to FIG. 2A, 2B and method 300 of FIG. 3.

In at least some embodiments, the UE 102 comprises one or more processing circuits 420 configured to implement processing of the method 300 of FIG. 3, such as by implementing functional means or units above. In one embodiment, for example, the processing circuit(s, 420 implements functional means or units as respective circuits. The circuits in this regard may comprise circuits dedicated to performing certain functional processing and/or one or more microprocessors in conjunction with memory 430. In embodiments that employ memory 430, which may comprise one or several types of memory such as read-only memory, ROM, random-access memory, cache memory, flash memory devices, optical storage devices, etc., the memory 430 stores program code that, when executed by the one or more for carrying out one or more microprocessors, carries out the techniques described herein.

In one or more embodiments, the UE 102 also comprises radio circuitry 410 that includes or is communicatively connected to various components, e.g., antennas 440, for sending and receiving data and control signals. More particularly, the radio circuitry 410 includes, in some examples, a transmitter that is configured to use known signal processing techniques, typically according to one or more standards, and is configured to condition a signal for transmission, e.g., over the air via one or more antennas 440. Similarly, the radio circuitry 410 can include or be communicatively connected to a receiver that is configured to convert signals received, e.g., via the antenna(s, 440, into digital samples for processing by the one or more processing circuits of processing circuitry 420. The transmitter and/or receiver may also include or be communicatively connected to one or more antennas 440.

Furthermore, as shown in FIG. 4B, UE 102 may include a determining module/unit 450 and a combining module/unit 460, and/or one or more further modules/means/units not explicitly shown, that are configured, individually or collectively, to perform aspects of method 300, or techniques described anywhere in the present disclosure, to carry out such techniques in UE 102. In particular, determining module/unit 450 can be configured to determine that a second RA procedure is triggered during a first RA procedure that is ongoing. In addition, combining module/unit 460 can be configured to combine the second RA procedure and the first RA procedure.

Figure 5:
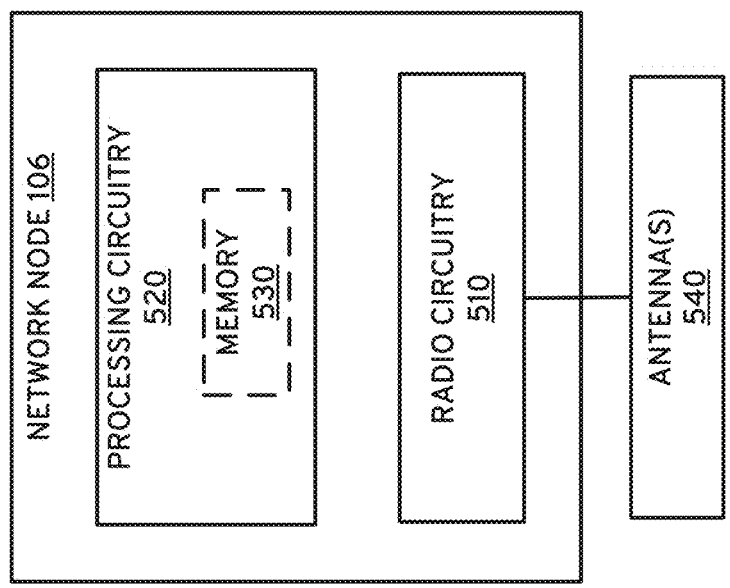
FIG. 5 illustrates details of an example network node according to one or more embodiments.

FIG. 5 illustrates additional details of an example network node 106 according to one or more embodiments. The network node 106 is configured to implement processing to perform the aspects described above in reference to the aspects of the techniques presented above.

In at least some embodiments, the network node 106 comprises one or more processing circuits 520 configured to implement processing of the techniques presented herein. In one embodiment, for example, the processing circuit(s, 520 implements functional means or units as respective circuits. The circuits in this regard may comprise circuits dedicated to performing certain functional processing and/or one or more microprocessors in conjunction with memory 530. In embodiments that employ memory 530, which may comprise one or several types of memory such as read-only memory, ROM, random-access memory, cache memory, flash memory devices, optical storage devices, etc., the memory 530 stores program code that, when executed by the one or more for carrying out one or more microprocessors, carries out the techniques described herein.

In one or more embodiments, the network node 106 also comprises radio circuitry 510 that includes or is communicatively connected to various components, e.g., antennas 540, for sending and receiving data and control signals. More particularly, the radio circuitry 510 includes, in some examples, a transmitter that is configured to use known signal processing techniques, typically according to one or more standards, and is configured to condition a signal for transmission, e.g., over the air via one or more antennas 540. Similarly, the radio circuitry 510 can include or be communicatively connected to a receiver that is configured to convert signals received, e.g., via the antenna(s, 540, into digital samples for processing by the one or more processing circuits of processing circuitry 520. The transmitter and/or receiver may also include or be communicatively connected to one or more antennas 540.

Those skilled in the art will also appreciate that embodiments herein further include corresponding computer programs. A computer program comprises instructions which, when executed on at least one processor of the network node 106 or UE 102, or UE or network node, cause these devices to carry out any of the respective processing described above. Furthermore, the processing or functionality may be considered as being performed by a single instance or device or may be divided across a plurality of instances of UE 102 and/or network node 106 that may be present in a given wireless system such that together the device instances perform all disclosed functionality.

Embodiments further include a carrier containing such a computer program. This carrier may comprise one of an electronic signal, optical signal, radio signal, or computer readable storage medium. A computer program in this regard may comprise one or more code modules corresponding to the means or units described above.

A network node 106 herein is any type of network node, e.g., a base station, capable of communicating with another node over radio signals. A UE 102 can be any type device capable of communicating with a network node 106 over radio signals, such as, but not limited to, a device capable of performing autonomous wireless communication with one or more other devices, including a machine-to-machine, M2M, device, a machine-type communications, MTC, device, a user equipment, UE), however it should be noted that the UE does not necessarily have a "user" in the sense of an individual person owning and/or operating the device. An UE may also be referred to as a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped, LEE, laptop-mounted equipment, LME, USB dangles, wireless customer-premises equipment, CPE, etc. In the discussion herein, the terms machine-to-machine, M2M, device, machine-type communication, MTC, device, wireless sensor, and sensor may also be used. It should be understood that these devices may be UEs, but are generally configured to transmit and/or receive data without direct human interaction.

Figure 6:
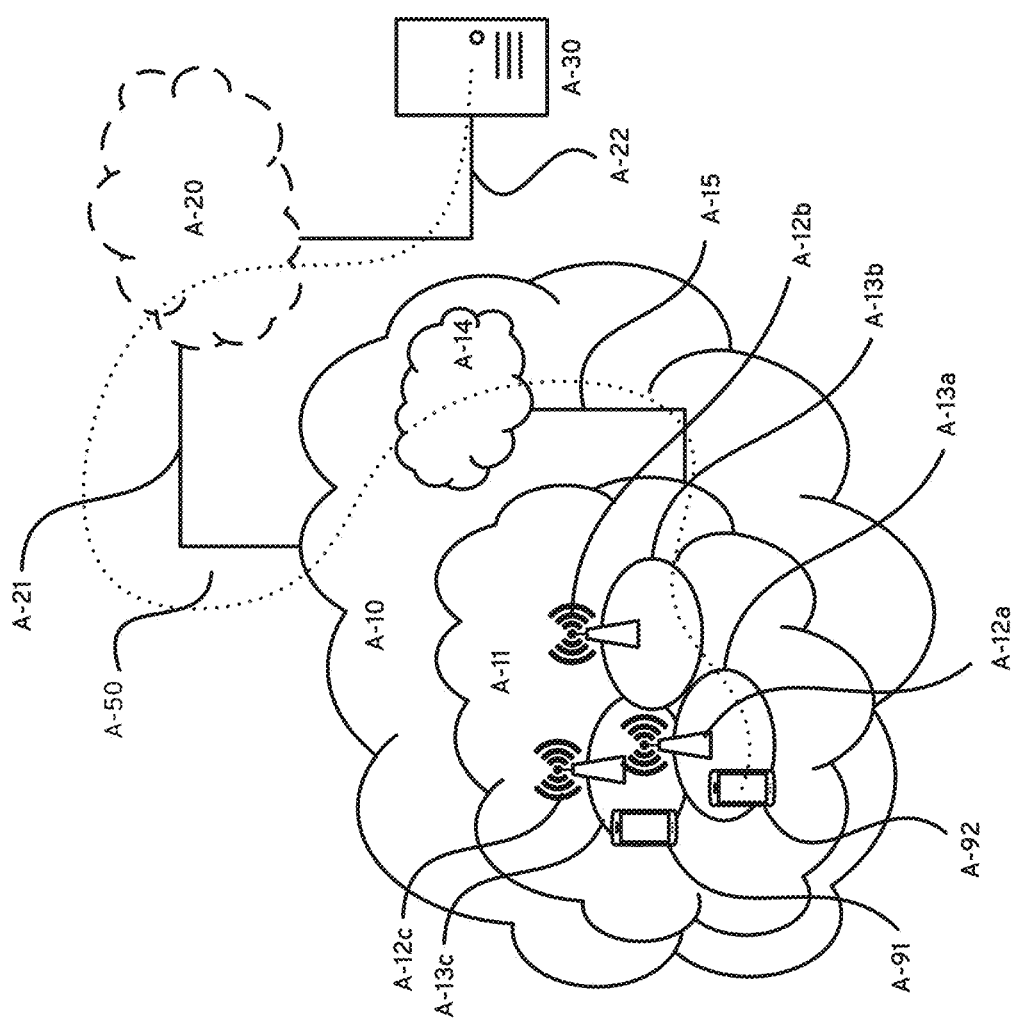
FIG. 6 schematically illustrates a telecommunication network connected via an intermediate network to a host computer.

FIG. 6 schematically illustrates a telecommunication network connected via an intermediate network to a host computer. With reference to FIG. 6, in accordance with an embodiment, a communication system includes a telecommunication network A-10, such as a 3GPP-type cellular network, which comprises an access network A-11, such as a radio access network, and a core network A-14. The access network A-11 comprises a plurality of base stations A-12a, A-12b, A-12c, such as NBs, eNBs, gNBs or other types of wireless access points, e.g. network nodes 106, each defining a corresponding coverage area A-13a, A-13b, A-13c. In an aspect, any of base stations A-12a, A-12b, A-12c, or any other base stations described herein may be considered to be a network node, for instance, if such as network node is described above in the present Application. Each base station A-12a, A-12b, A-12c is connectable to the core network A-14 over a wired or wireless connection A-15. A first user equipment, UE, A-91, i.e. terminal 102, located in coverage area A-13c is configured to wirelessly connect to, or be paged by, the corresponding base station A-12c. A second UE A-92 in coverage area A-13a is wirelessly connectable to the corresponding base station A-12a. While a plurality of UEs A-91, A-92 are illustrated in this example, the disclosed embodiments are equally applicable to a situation where a sole UE is in the coverage area or where a sole UE is connecting to the corresponding base station A-12. In an aspect, any of these UEs, or any other UE described herein may be considered to be configured to perform the aspects of any UE, user terminal, client device, or mobile device described above in the present Application.

The telecommunication network A-10 is itself connected to a host computer A-30, which may be embodied in the hardware and/or software of a standalone server, a cloud-implemented server, a distributed server or as processing resources in a server farm. The host computer A-30 may be under the ownership or control of a service provider or may be operated by the service provider or on behalf of the service provider. The connections A-21, A-22 between the telecommunication network A-10 and the host computer A-30 may extend directly from the core network A-14 to the host computer A-30 or may go via an optional intermediate network A-20. The intermediate network A-20 may be one of, or a combination of more than one of, a public, private or hosted network; the intermediate network A-20, if any, may be a backbone network or the Internet; in particular, the intermediate network A-20 may comprise two or more sub-networks, not shown.

The communication system of FIG. 6 as a whole enables connectivity between one of the connected UEs A-91, A-92 and the host computer A-30. The connectivity may be described as an over-the-top, OTT, connection A-50. The host computer A-30 and the connected UEs A-91, A-92 are configured to communicate data and/or signaling via the OTT connection A-50, using the access network A-11, the core network A-14, any intermediate network A-20 and possible further infrastructure, not shown, as intermediaries. The OTT connection A-50 may be transparent in the sense that the participating communication devices through which the OTT connection A-50 passes are unaware of routing of uplink and downlink communications. For example, a base station A-12 may not or need not be informed about the past routing of an incoming downlink communication with data originating from a host computer A-30 to be forwarded, e.g., handed over, to a connected UE A-91. Similarly, the base station A-12 need not be aware of the future routing of an outgoing uplink communication originating from the UE A-91 towards the host computer A-30.

Figure 7:
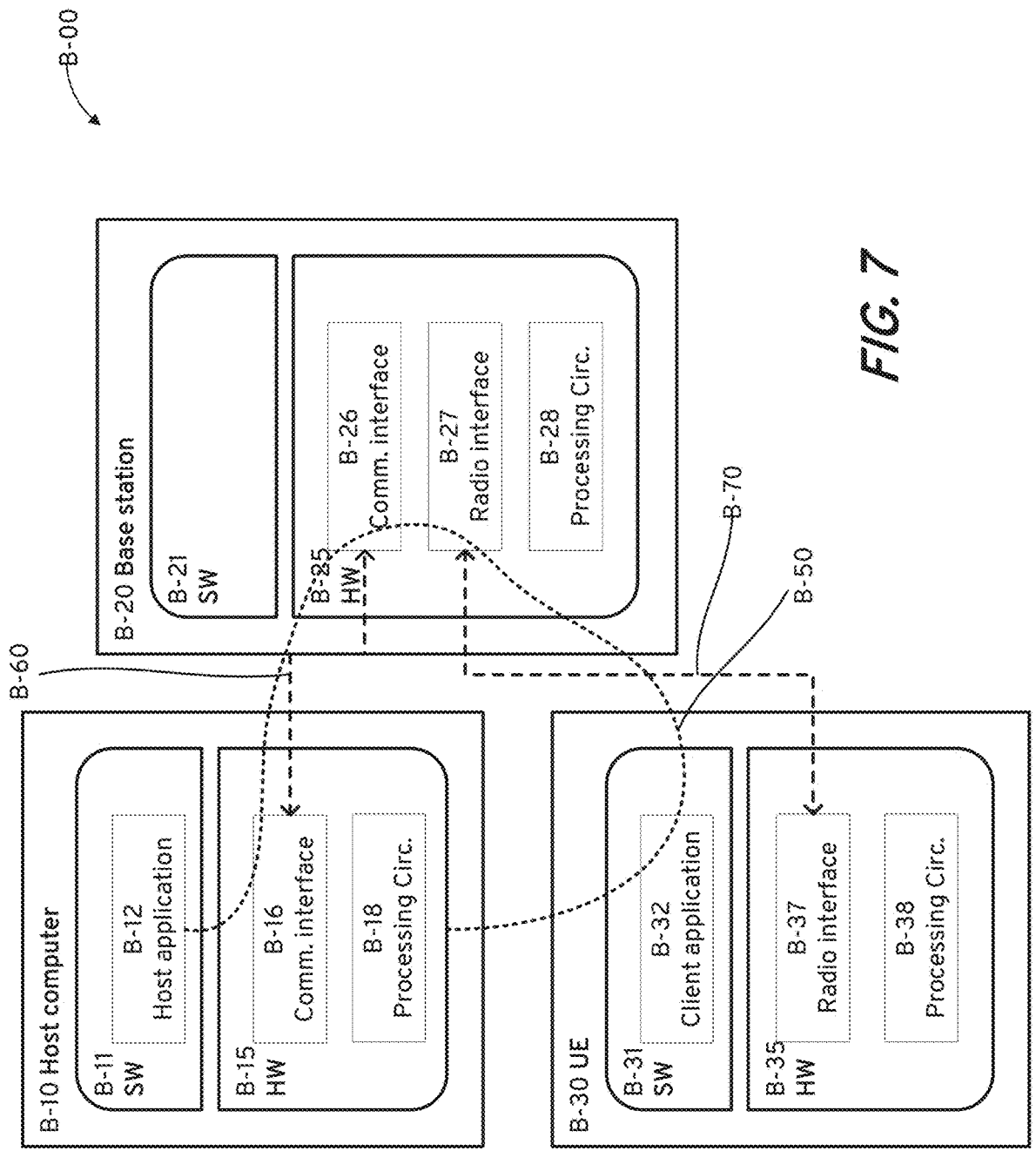
FIG. 7 is a generalized block diagram of a host computer communicating via a base station with a user equipment over a partially wireless connection.

Example implementations, in accordance with an embodiment, of the UE, base station and host computer discussed in the preceding paragraphs will now be described with reference to FIG. 7, which is shown below. FIG. 7 is a generalized block diagram of a host computer communicating via a base station with a user equipment over a partially wireless connection.

In a communication system B-00, a host computer B-10 comprises hardware B-15 including a communication interface B-16 configured to set up and maintain a wired or wireless connection with an interface of a different communication device of the communication system B-00. The host computer B-10 further comprises processing circuitry B-18, which may have storage and/or processing capabilities. In particular, the processing circuitry B-18 may comprise one or more programmable processors, application-specific integrated circuits, field programmable gate arrays or combinations of these, not shown, adapted to execute instructions. The host computer B-10 further comprises software B-11, which is stored in or accessible by the host computer B-10 and executable by the processing circuitry B-18. The software B-11 includes a host application B-12. The host application B-12 may be operable to provide a service to a remote user, such as a UE B-30 connecting via an OTT connection B-50 terminating at the UE B-30 and the host computer B-10. In providing the service to the remote user, the host application B-12 may provide user data which is transmitted using the OTT connection B-50.

The communication system B-00 further includes a base station B-20 provided in a telecommunication system and comprising hardware B-25 enabling it to communicate with the host computer B-10 and with the UE B-30. The hardware B-25 may include a communication interface B-26 for setting up and maintaining a wired or wireless connection with an interface of a different communication device of the communication system B-00, as well as a radio interface B-27 for setting up and maintaining at least a wireless connection B-70 with a UE B-30 located in a coverage area, not shown in FIG. 7, served by the base station B-20.

The communication interface B-26 may be configured to facilitate a connection B-60 to the host computer B-10. The connection B-60 may be direct or it may pass through a core network, not shown in FIG. 7, of the telecommunication system and/or through one or more intermediate networks outside the telecommunication system. In the embodiment shown, the hardware B-25 of the base station B-20 further includes processing circuitry B-28, which may comprise one or more programmable processors, application-specific integrated circuits, field programmable gate arrays or combinations of these, not shown, adapted to execute instructions. The base station B-20 further has software B-21 stored internally or accessible via an external connection.

The communication system B-00 further includes the UE B-30, which has already been referred to above. Its hardware B-35 may include a radio interface B-37 configured to set up and maintain a wireless connection B-70 with a base station serving a coverage area in which the UE B-30 is currently located. The hardware B-35 of the UE B-30 further includes processing circuitry B-38, which may comprise one or more programmable processors, application-specific integrated circuits, field programmable gate arrays or combinations of these, not shown, adapted to execute instructions. The UE B-30 further comprises software B-31, which is stored in or accessible by the UE B-30 and executable by the processing circuitry B-38.

The software B-31 includes a client application B-32. The client application B-32 may be operable to provide a service to a human or non-human user via the UE B-30, with the support of the host computer B-10. In the host computer B-10, an executing host application B-12 may communicate with the executing client application B-32 via the OTT connection B-50 terminating at the UE B-30 and the host computer B-10. In providing the service to the user, the client application B-32 may receive request data from the host application B-12 and provide user data in response to the request data. The OTT connection B-50 may transfer both the request data and the user data. The client application B-32 may interact with the user to generate the user data that it provides.

Figure 10:
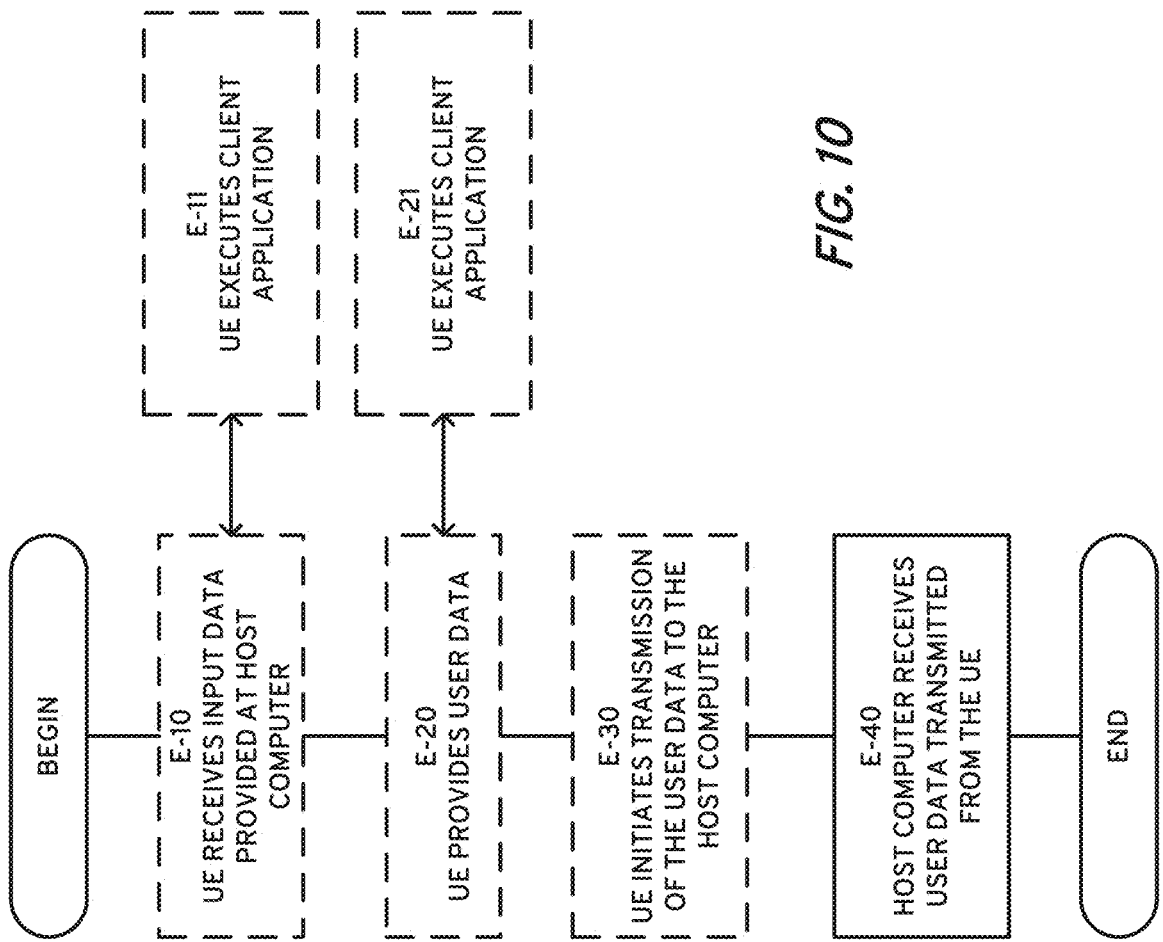

It is noted that the host computer B-10, base station B-20 and UE B-30 illustrated in FIG. 7 may be identical to the host computer A-30, one of the base stations A-12a, A-12b, A-12c and one of the UEs A-91, A-92 of FIG. 6, respectively. This is to say, the inner workings of these entities may be as shown in FIG. 10 and independently, the surrounding network topology may be that of FIG. 7.

In FIG. 7, the OTT connection B-50 has been drawn abstractly to illustrate the communication between the host computer B-10 and the use equipment B-30 via the base station B-20, without explicit reference to any intermediary devices and the precise routing of messages via these devices. Network infrastructure may determine the routing, which it may be configured to hide from the UE B-30 or from the service provider operating the host computer B-10, or both. While the OTT connection B-50 is active, the network infrastructure may further take decisions by which it dynamically changes the routing, e.g., on the basis of load balancing consideration or reconfiguration of the network.

The wireless connection B-70 between the UE B-30 and the base station B-20 is in accordance with the teachings of the embodiments described throughout this disclosure. One or more of the various embodiments improve the performance of OTT services provided to the UE B-30 using the OTT connection B-50, in which the wireless connection B-70 forms the last segment. More precisely, the teachings of these embodiments can improve one or more of data rate, latency, and/or power consumption associated with one or more devices and/or communications of/performed in communication system B-00, and thereby can provide benefits for OTT user data communication, such as one or more of reduced user waiting time, relaxed restriction on file size, better responsiveness, and/or extended battery lifetime.

A measurement procedure may be provided for the purpose of monitoring data rate, latency and other factors on which the one or more embodiments improve. There may further be an optional network functionality for reconfiguring the OTT connection B-50 between the host computer B-10 and UE B-30, in response to variations in the measurement results. The measurement procedure and/or the network functionality for reconfiguring the OTT connection B-50 may be implemented in the software B-11 of the host computer B-10 or in the software B-31 of the UE B-30, or both.

In embodiments, sensors, not shown, may be deployed in or in association with communication devices through which the OTT connection B-50 passes; the sensors may participate in the measurement procedure by supplying values of the monitored quantities exemplified above, or supplying values of other physical quantities from which software B-11, B-31 may compute or estimate the monitored quantities. The reconfiguring of the OTT connection B-50 may include message format, retransmission settings, preferred routing etc.; the reconfiguring need not affect the base station B-20, and it may be unknown or imperceptible to the base station B-20.

Such procedures and functionalities may be known and practiced in the art. In certain embodiments, measurements may involve proprietary UE signaling facilitating the host computer's B-10 measurements of throughput, propagation times, latency and the like. The measurements may be implemented in that the software B-11, B-31 causes messages to be transmitted, in particular empty or 'dummy' messages, using the OTT connection B-50 while it monitors propagation times, errors etc.

FIGS. 12, 13, 14, and 15, below, are flowcharts illustrating methods implemented in a communication system including a host computer, a base station and a user equipment.

Figure 8:
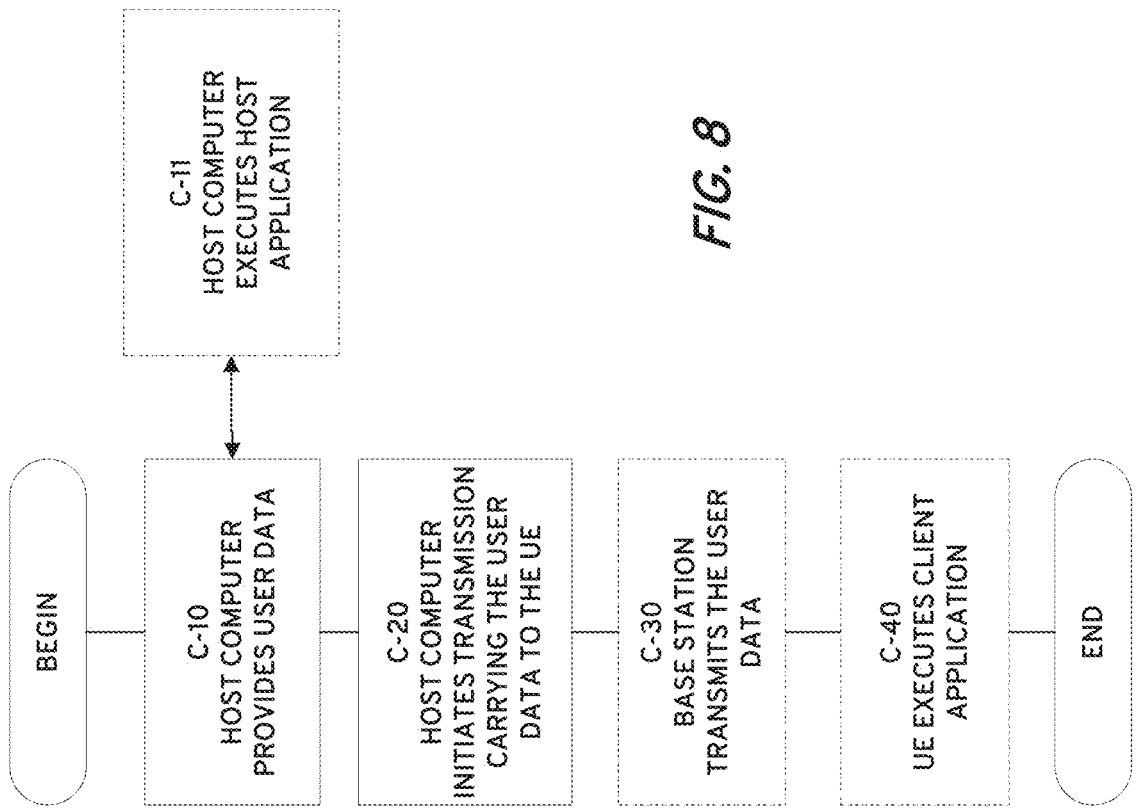
FIGS. 8, 9, 10, and 11 include flowcharts illustrating methods implemented in a communication system including a host computer, a base station and a user equipment.

FIG. 8 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 8 will be included in this section. In a first step C-10 of the method, the host computer provides user data.

In an optional substep C-11 of the first step C-10, the host computer provides the user data by executing a host application. In a second step C-20, the host computer initiates a transmission carrying the user data to the UE.

In an optional third step C-30, the base station transmits to the UE the user data which was carried in the transmission that the host computer initiated, in accordance with the teachings of the embodiments described throughout this disclosure. In an optional fourth step C-40, the UE executes a client application associated with the host application executed by the host computer.

Figure 9:
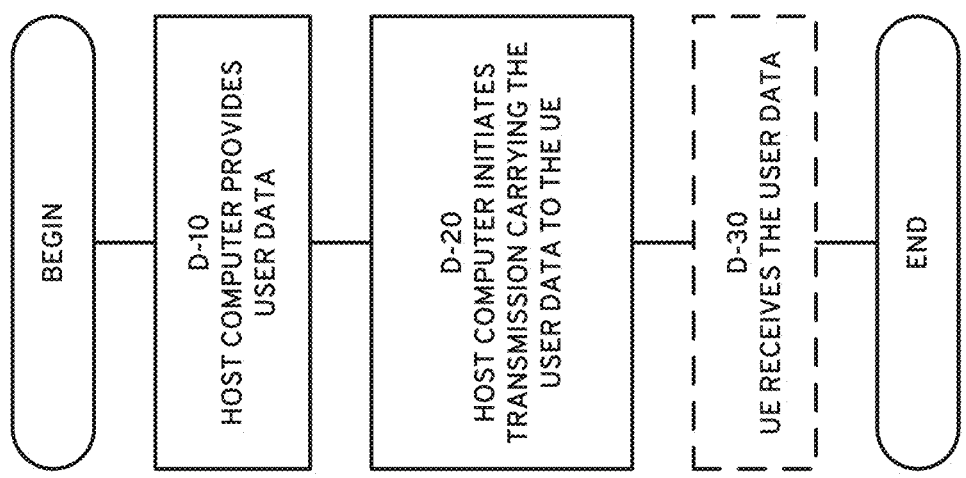

FIG. 9 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 9 will be included in this section. In a first step D-10 of the method, the host computer provides user data.

In an optional substep, not shown, the host computer provides the user data by executing a host application. In a second step D-20, the host computer initiates a transmission carrying the user data to the UE. The transmission may pass via the base station, in accordance with the teachings of the embodiments described throughout this disclosure. In an optional third step D-30, the UE receives the user data carried in the transmission.

FIG. 10 is a flowchart illustrating a method implemented in a communication system, in accordance with one embodiment.

The communication system includes a host computer, a base station and a UE which may be those described with reference to FIGS. 10 and 11. For simplicity of the present disclosure, only drawing references to FIG. 10 will be included in this section. In an optional first step E-10 of the method, the UE receives input data provided by the host computer. Additionally or alternatively, in an optional second step E-20, the UE provides user data. In an optional substep E-21 of the second step E-20, the UE provides the user data by executing a client application. In a further optional substep E-11 of the first step E-10, the UE executes a client application which provides the user data in reaction to the received input data provided by the host computer. In providing the user data, the executed client application may further consider user input received from the user. Regardless of the specific manner in which the user data was provided, the UE initiates, in an optional third substep E-30, transmission of the user data to the host computer. In a fourth step E-40 of the method, the host computer receives the user data transmitted from the UE, in accordance with the teachings of the embodiments described throughout this disclosure.

Figure 11:
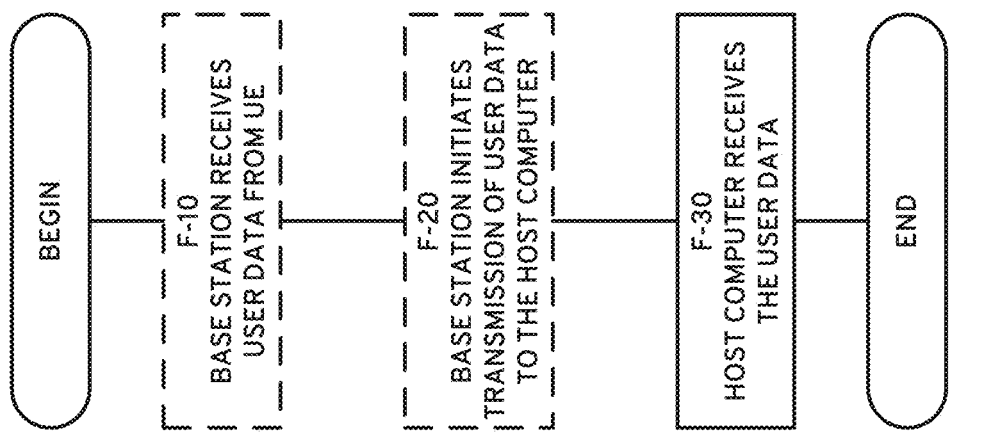

FIG. 11 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 11 will be included in this section. In an optional first step F-10 of the method, in accordance with the teachings of the embodiments described throughout this disclosure, the base station receives user data from the UE. In an optional second step F-20, the base station initiates transmission of the received user data to the host computer. In a third step F-30, the host computer receives the user data carried in the transmission initiated by the base station.

The present embodiments may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. A method in a user equipment (UE) for performing random access (RA) to connect to a wireless access network, the method comprising:
    combining a second RA procedure and a first RA procedure responsive to determining that the second RA procedure was triggered while the first RA procedure is ongoing and before a RA response is received for the first RA procedure; and
    transmitting a combined RA message for the combined first and second RA procedures at a transmission occasion for the first RA procedure or the second RA procedure.

2. The method of claim 1, wherein the combined RA message comprises a reserved preamble that identifies the combined RA message as representing a preamble transmission for multiple RA processes.

3. The method of claim 1, wherein the transmitting the combined RA message comprises transmitting the combined RA message over time-frequency resources reserved for combined RA messages, thereby identifying the combined RA message as representing a preamble transmission for multiple RA processes.

4. The method of claim 1, wherein the combining comprises setting a transmission power for any RA messages by continuing a transmission power ramping from the first RA procedure.

5. The method of claim 1, further comprising continuing a back-off operation according to a backoff indicator (BI) value for any RA messages as a most recently used BI for any transmission in the first RA procedure.

6. The method of claim 1:
    further comprising determining that the second RA procedure is of a higher priority than the first RA procedure; and
    wherein the combining is responsive to determining that the second RA procedure is of a higher priority than the first RA procedure.

7. The method of claim 1, further comprising transmitting the combined RA messages via a multiplexed RA message, the multiplexed RA message comprising a first RA message corresponding to the first RA procedure multiplexed with a second RA message corresponding to the second RA procedure.

8. A user equipment (UE) for performing random access (RA) to connect to a wireless access network, the UE comprising:
    processing circuitry; and
    memory storing instructions such that, when executed by the processing circuitry cause the UE to:
        combine a second RA procedure and a first RA procedure responsive to determining that the second RA procedure was triggered while the first RA procedure is ongoing and before a RA response is received for the first RA procedure; and
        transmit a combined RA message for the combined first and second RA procedures at a transmission occasion for the first RA procedure or the second RA procedure.

9. The UE of claim 8, wherein the combined RA message comprises a reserved preamble that identifies the combined RA message as representing a preamble transmission for multiple RA processes.

10. The UE of claim 8, wherein the instructions are such that they, when executed by the processing circuitry, cause the UE to transmit the combined RA message over time-frequency resources reserved for combined RA messages, thereby identifying the combined RA message as representing a preamble transmission for multiple RA processes.

11. The UE of claim 8, wherein the instructions are such that they, when executed by the processing circuitry, cause the UE to set a transmission power for any RA messages by continuing a transmission power ramping from the first RA procedure.

12. The UE of claim 8, wherein the instructions are such that they, when executed by the processing circuitry, cause the UE to continue a back-off operation according to a backoff indicator (BI) value for any RA messages as a most recently used BI for any transmission in the first RA procedure.

13. The UE of claim 8:
    wherein the instructions are such that they, when executed by the processing circuitry, cause the UE to determine that the second RA procedure is of a higher priority than the first RA procedure; and
    wherein the combining is responsive to determining that the second RA procedure is of a higher priority than the first RA procedure.

14. The UE of claim 8, wherein the instructions are such that they, when executed by the processing circuitry, cause the UE to transmit at least one combined RA message via a multiplexed RA message, the multiplexed RA message comprising a first RA message corresponding to the first RA procedure multiplexed with a second RA message corresponding to the second RA procedure.

15. A non-transitory computer readable recording medium storing a computer program product for controlling a user equipment (UE) for performing random access (RA) to connect to a wireless access network, the computer program product comprising software instructions which, when run on processing circuitry of the UE, causes the UE to:
- combine a second RA procedure and a first RA procedure responsive to determining that the second RA procedure was triggered while the first RA procedure is ongoing and before a RA response is received for the first RA procedure; and
- transmit a combined RA message for the combined first and second RA procedures at a transmission occasion for the first RA procedure or the second RA procedure.

* * * * *